2,863,921

1-DIMETHYLAMINO-2-PHENYL-3-METHYLPENTANE

Werner Stühmer, Eldagsen, near Hannover, and Siegfried Funke, Hannover, Germany, assignors to Kali-Chemie Aktiengesellschaft, Hannover, Germany No Drawing. Application March 19, 1956
Serial No. 572,217

Claims priority, application Germany March 21, 1955

2 Claims. (Cl. 260—570.8)

The invention relates to amino compounds and more particularly to specific N,N-disubstituted aminophenyl-alkanes having a pharmacologic action.

We have found that N,N-disubstituted 1-amino-2-phenyl-3-methyl-pentanes of the general formula

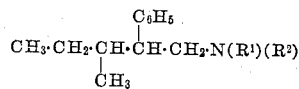

wherein $R^1$ and $R^2$ designate methyl or ethyl, and salts of said compounds, are useful therapeutic agents showing particularly analgesic efficiency.

A compound of the above formula, wherein $R^1=R^2$ methyl, the hydrochloride of which is suitable for injections, shows analgesic efficiency which is considerably stronger than that of the conventional antipyretics. In addition, said 1-dimethylamino-2-phenyl-3-methyl-pentane produces spasmolytic and good endoanesthetic effects, and shows synergistic action in combination with morphine.

The analgesic effect of the compound was determined on white mice by means of the thermal radiation technique, whereby rays of strong light were focussed on the forehead, as well as on the tip of the tail. For subcutaneous injection, the required dose was 50 mg./kg. The result of the pharmacological tests has been confirmed by clinical tests, which proved that the compound is an efficient analgesic for humans.

For clinical treatment, the compound has been used in the form of ampoules (100 mg./ccm.) and tablets (100-mg./tablet). The ampoules have been used for relieving post-operative pain, toothache, and light renal colics. The dosage has been 100 to 200 mg. in the form of the ampoules.

The tablets have been administered against neuralgic pains, headaches, toothaches, and light post-operative pains. With an average dosage of 1 tablet 3 times daily, good results have been obtained, and no side effects have been observed.

Similar results are obtained with the dialkyl amino compound.

Various procedures may be used to prepare the compounds. 1-halo-2-phenyl-3-methyl-pentane may be used as starting material and reacted with secondary dialkyl-amines; or 1-aldehydo-2-phenyl-3-methyl-pentane may be reduced catalytically by means of metals in the presence of dialkylamines. In another procedure, 1-dialkyl-amino-2-phenyl-2-halo-3-methyl-pentane may be reduced catalytically by hydrogen or by means of metals.

The compounds may be further prepared from 1-oxy-2-phenyl-3-methyl-pentanes by converting said compounds by known methods into esters of aryl or alkyl sulfonic acid, for instance of benzene or toluene sulfonic acid, and by reacting said esters with secondary dialkyl-amines under conditions in which the sulfonic acid radical is replaced by the amine radical.

Finally, the compounds can be prepared by converting 1-amino-2-phenyl-3-methyl-pentane ($R^1$ and $R^2$ in above formula=H) or its N-monosubstitution products ($R^1$=H; $R^2$=alkyl) by means of alkylating agents, or by catalytic reduction in the presence of carbonyl compounds, in the corresponding N,N-disubstituted 1-amino-2-phenyl-3-methyl pentanes. Suitable alkylating agents are, for instance, halogen alkyls, dialkyl sulfates, aldehydes, formic acid.

The amino products may be isolated, as such, or may be found more useful in the form of acid addition salts thereof. These salts may be prepared in a manner well known in the art. Useful salts are, for instance, the sulfate, phosphate, tartrate, lactate, and the like, and particularly the hydrochloride, which are easily prepared in a known manner.

The various procedures are illustrated by the following specific examples, but it is to be understood that the details given are not to be taken as limitative of the invention, since equivalent procedures and variations in reactants may be used without departing from the spirit of the invention.

EXAMPLE 1

*1-dimethylamino-2-phenyl-3-methyl-pentane*

($R^1=R^2=CH_3$)

23 g. of formic acid (98%) and 20 cc. of aqueous formaldehyde solution (35%) were added to 17.7 g. of 1-amino-2-phenyl-3-methyl-pentane ($R^1=R^2=H$) of $b_{13}=126$–$130°$ C., and the mixture was heated for 15 hours at 95° C. Then 15 cc. of conc. sulfuric acid were added, and the solution was evaporated in vacuo to dryness. The solid residue was dissolved in water, and the solution was made alkaline with 40% caustic soda. The precipitated oily base was taken up in ether, and the ethereal solution was dried with sodium sulfate. After distilling off the ether, the base was distilled under reduced pressure. The base had a boiling point of 105–107° C. at 4 mm. Hg; the hydrochloride recrystallized from alcohol had a melting point of 205–206° C. and was readily soluble in water.

The starting primary amine ($R^1=R^2=H$) had been prepared by catalytic reduction of the corresponding nitrile as follows:

518 g. of alpha-sec. butyl-phenyl acetonitrile were dissolved in 100 cc. of alcohol containing a spatula spoon of Raney nickel, and ammonia gas was passed into the solution. Subsequently, the nitrile was catalytically reduced with hydrogen at a pressure of 120 atm. and a temperature of 160–185° C. After the reduction had been completed, the mixture was filtered to remove the catalyst, the alcohol was distilled off in vacuno, and the residue was taken up in hydrochloric acid. After extracting the acid solution with ether, it was made alkaline with 40% sodium hydroxide solution; the precipitated oil was taken up in ether, the ethereal solution was dried with sodium sulfate and distilled in vacuo. 1-amino-2-phenyl-3-methyl-pentane was obtained in a yield of 87.2 percent, $b_{13}=126$–$130°$ C.; $n_D^{20}=1.5148$.

EXAMPLE 2

*1-dimethylamino-2-phenyl-3-methyl-pentane*

($R^1=R^2=CH_3$)

8.8 g. of 1-amino-2-phenyl-3-methyl-pentane ($R^1=R^2=H$; $b_{13}=126$–$130°$ C.) were slowly added, with stirring, to 20 g. of dimethyl sulfate, which had been heated to 170° C. Heating at 170° C. was continued 1 hour, with stirring. After cooling, the solution was diluted with 40 cc. of ice water, and 10 cc. of conc. hydrochloric and 36 cc. of 10% sodium nitrile solution were added. Then the acid solution was briefly extracted with ether, and subsequently made alkaline with 40% caustic soda. The separated oily tertiary amine was taken up in ether, dried with sodium sulfate, and distilled in vacuo. It had a boiling point of 105° C. at 5 mm. Hg, and after solution in ether and introduction of hydrogen chloride, a hydrochloride from alcohol-ether was obtained, which had a melting point of 204–205° C. and was identical with the hydrochloride described in Example 1.

EXAMPLE 3

1-diethylamino-2-phenyl-3-methyl-pentane ($R^1=R^2=C_2H_5$)

8 g. of 1-diethylamino-2-phenyl-3-methyl-pentane ($R^1=R^2=H$; $b_{13}=126–130°$ C.)

were slowly dropped, with stirring, into 25 cc. of diethyl sulfate, which was heated at 180° C. Subsequently, stirring was continued for some time at 180° C., and the reaction mixture was worked up as set forth in Example 2. The obtained oily base had a boiling point of 140–141° C. at 14 mm. Hg; its readily water soluble hydrochloride, recrystallized from an alcohol-ether mixture, had a melting point of 212–217° C.

EXAMPLE 4

1-methylethylamino-2-phenyl-3-methyl-pentane ($R^1=CH_3$; $R_2=C_2H_5$)

23.4 g. of formic acid (98%) and 16.5 cc. of aqueous formaldehyde solution (40%) were added to 12 g. of 1-ethylamino-2-phenyl-3-methyl-pentane ($R^1=H$, $R^2=C_2H_5$; $b_{13}=128–138°$ C.)

prepared by alkylation of 1-amino-2-phenyl-3-methyl-pentane ($R^1=R^2=H$) by means of ethyl bromide. The solution was heated for 15 hours at 100° C. Subsequently 30 cc. of conc. hydrochloric acid were added, and heating was continued for 2 more hours. Then the solution was evaporated in vacuo to dryness, the residue was dissolved in water, and briefly shaken with ether. The aqueous solution was separated and made alkaline with a 40% solution of sodium hydroxide; the separated base was taken up in ether, dried with sodium sulfate, and distilled. It had a boiling point of 105° C. at 5 mm. Hg; its hydrochloride, percipitated from an alcohol-ether solution, had a melting point of 120–122° C.

EXAMPLE 5

1-dimethylamino-2-phenyl-3-methyl-pentane ($R^1=R^2=CH_3$)

70 g. of methyl iodide were added, with stirring, to 53 g. of 1-amino-2-phenyl-3-methyl-pentane ($R^1=R^2=H$; $b_{13}=126–130°$ C.)

The obtained solid precipitate was dissolved in an excess of a 40% caustic soda solution; the separated oil was taken up in ether and dried with sodium sulfate. After distillation of the ether, 34 g. of the obtained crude amine were dissolved in 50 cc. of conc. hydrochloric acid and 175 cc. of water, and 21 g. of sodium nitrite, dissolved in water, were added. As no precipitation of nitrosamine took place, the acid solution was made alkaline; the separated oil was taken up in ether and dried with sodium sulfate. After removal of the ether, the oily base was distilled. It had a boiling point of 107–108° C. at 5 mm. Hg and yielded from alcohol-ether a hydrochloride having a melting point of 201–202° C., which was identical with the hydrochloride obtained according to Example 1.

EXAMPLE 6

1-dimethylamino-2-phenyl-3-methyl-pentane ($R^1=R^2=CH_3$)

3.9 g. of 1-chloro-2-phenyl-3-methyl-pentane ($b_9=118–124°$ C.)

and 4 cc. of a 33% methanolic dimethylamine solution were heated in a sealed tube for 8 hours at 100–140° C. After cooling, the product was acidified with hydrochloric acid, and the solution was concentrated in vacuo. The dry residue was dissolved in water and made alkaline with a 40% sodium hydroxide solution; the separated oil was extracted with ether, dried with sodium sulfate and distille in vacuo, $b_{10}=115°$ C.; the hydrochloride from alcohol-ether had a melting point of 203° C. and was identical with the hydrochloride of Example 1.

EXAMPLE 7

1-dimethylamino-2-phenyl-3-methyl-pentane ($R^1=R^2=CH_3$)

5 g. of p-toluene sulfonic acid ester of 2-phenyl-3-methyl-amyl alcohol ($b_{10}=131–133°$ C.) and 18 g. of 33% methanolic dimethylamine solution were heated in a sealed tube for 8 hours at 100–40° C. Subsequently, hydrochloric acid was added, and the acid solution was concentrated in vacuo. The solid residue was dissolved in water and shaken with ether; the aqueous phase was made alkaline with 40% sodium hydroxide solution. The separated tertiary base was taken up in ether and dried with sodium sulfate. Its hydrochloride had a melting point of 202–202.5° C. and was identical with the hydrochloride of Example 1.

EXAMPLE 8

1-dimethylamino-2-phenyl-3-methyl-pentane ($R^1=R^2=CH_3$)

2.1 g. of 1-dimethylamino-2-phenyl-3-methyl-pentane were subjected to a catalytical reduction in 150 cc. of 50% aqueous methanol in the presence of Raney nickel at 90° C. and a total pressure of 4.4 atm. After the reaction was terminated, the catalyst was filtered off and the solution was evaporated to dryness in vacuo. The residue was dissolved in dilute hydrochloric acid and extracted with ether; the acid solution was made alkaline and the separated oil was taken up in ether. After drying with sodium sulfate, the hydrochloride was precipitated by passing hydrogen chloride into the ether solution; it had a melting point of 201–203° C. and was identical with the hydrochloride of Example 1.

The starting chlorinated compound had been prepared by converting ω-dimethylamino acetophenone ($b_{13}=113–116°$ C.)

with sec. butyl bromide in a Grignard procedure to 1-dimethylamino-2-phenyl-2-oxy-3-methyl-pentane ($b_9=120–128°$ C.)

and subsequently chlorinating the latter with thionyl chloride.

EXAMPLE 9

1-dimethylamino-2-phenyl-3-methyl-pentane 17.7 g. of 1-amino-2-phenyl-3-methyl-pentane ($R^1=R^2=H$; $b_{13}=126–130°$ C.)

were dissolved in 100 cc. of ethanol, and 25.8 g. of a 35% formaldehyde solution and 1 g. of anhydrous sodium acetate were added to the solution. Subsequently, the reaction mixture was catalytically reduced in the presence of Raney nickel at a hydrogen pressure of 3.4 atm. and a temperature of 20° C. After the reduction was completed, the catalyst was filtered off and the solution was evaporated to dryness in vacuo. The residue was extracted with ether, and the ether solution was dried with sodium sulfate. After removal of the ether, the oily residue was distilled. It had a boiling point of 114–116° C. at 9 mm. Hg; the hydrochloride had a melting point of 200–205° C. and was identical with the hydrochloride obtained according to Example 1.

We claim:
1. As new compounds, 1-dimethylamino-2-phenyl-3-methyl pentane of the formula

$$CH_3 \cdot CH_2 \cdot CH - \underset{\underset{CH_3}{|}}{\overset{\overset{C_6H_5}{|}}{CH}} \cdot CH_2 \cdot N(CH_3)_2$$

and the pharmacologically acceptable acid addition salts thereof.
2. 1-dimethylamino-2-phenyl-3-methyl-pentane hydrochloride.

References Cited in the file of this patent
UNITED STATES PATENTS
2,441,518    Suter et al. _____ May 11, 1948
FOREIGN PATENTS
119,265    Australia _____ Nov. 21, 1944
OTHER REFERENCES
Thomson et al.: J. A. C. S., Pt. I, page 1939 (1932).
Woodruff et al.: J. A. C. S, vol. 62, pages 922 (1940).
Weston et al.: J. A. C. S., vol. 65, page 676 (1943).